United States Patent
Grams

[11] Patent Number: 6,079,743
[45] Date of Patent: Jun. 27, 2000

[54] MOTOR VEHICLE STEERING COLUMN UNIT

[75] Inventor: Kai-Uwe Grams, Cappeln, Germany

[73] Assignee: Lemforder Metallwaren AG, Germany

[21] Appl. No.: 08/944,484

[22] Filed: Oct. 6, 1997

[30] Foreign Application Priority Data

Oct. 7, 1996 [DE] Germany .......................... 196 41 152

[51] Int. Cl.⁷ ...................................................... B62D 1/18
[52] U.S. Cl. .......................................... 280/775; 280/779
[58] Field of Search ................................... 280/779, 775; 74/493

[56] References Cited

U.S. PATENT DOCUMENTS

| 4,967,618 | 11/1990 | Matsumoto et al. | 280/775 |
| 5,848,557 | 12/1998 | Sugiki et al. | 74/493 |

FOREIGN PATENT DOCUMENTS

| 461025 | 12/1991 | European Pat. Off. | 74/493 |
| 42 17 664 A1 | 12/1992 | Germany . | |
| 691 09 541 T2 | 9/1995 | Germany . | |

*Primary Examiner*—Eric Culbreth
*Attorney, Agent, or Firm*—McGlew and Tuttle, PC

[57] ABSTRACT

A motor vehicle steering column unit with a steering column housing and a steering column arranged therein and with an electrically driven adjusting device is disclosed for the longitudinal adjustment and for the tilt adjustment of the steering column. The adjusting device has only one electric drive unit for the rotary drive of an adjusting spindle, as well as at least two spindle nuts, which are arranged on the adjusting spindle and are mounted movably in the axial direction of the adjusting spindle. At least one adjusting mechanism each for the longitudinal movement and for the tilting movement, as well as one switching device for each direction of movement is provided. A nonpositive connection can be established between the respective switching device and the spindle nut located adjacent to the switching device.

12 Claims, 4 Drawing Sheets

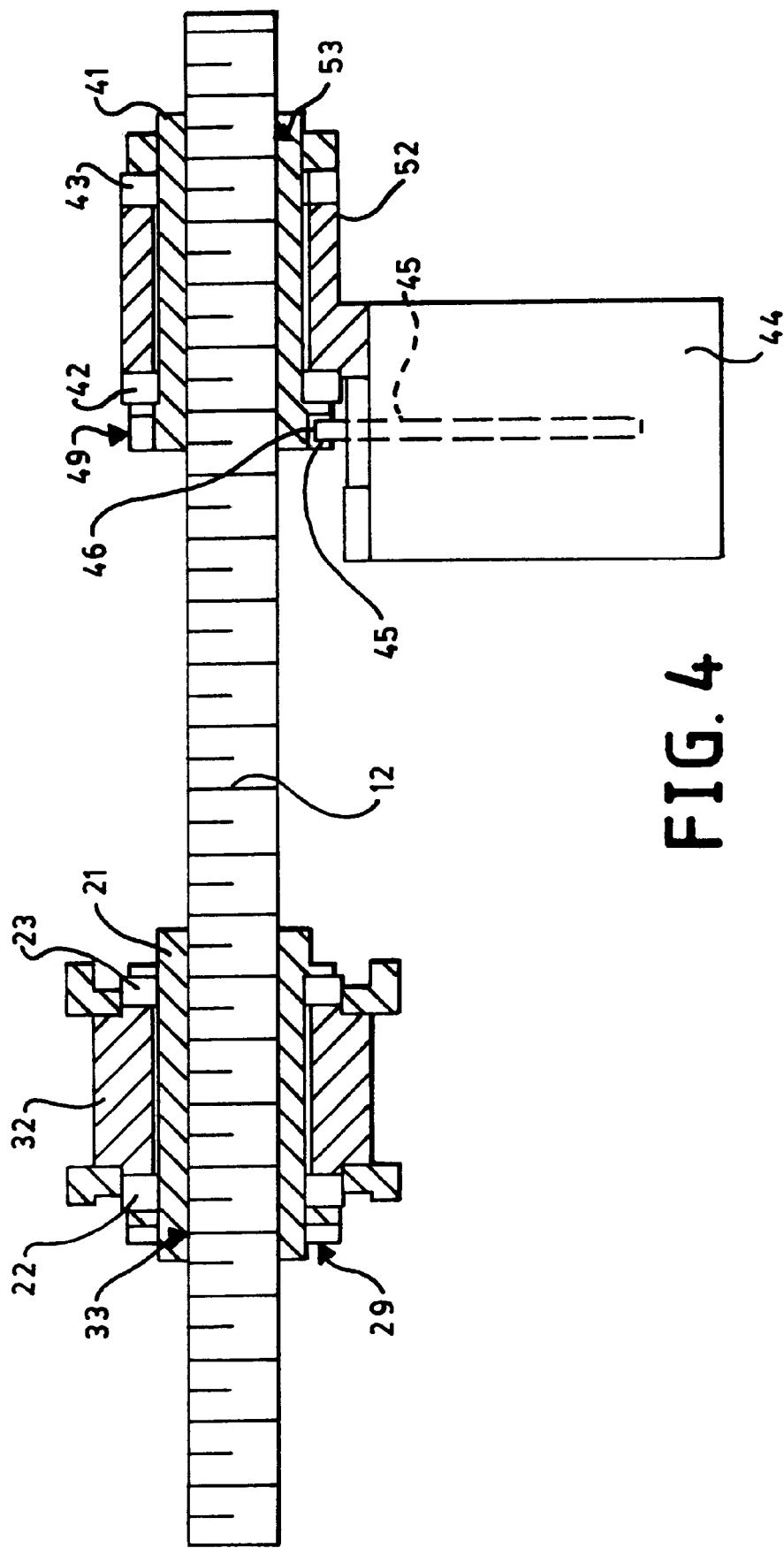

MOTOR VEHICLE STEERING COLUMN UNIT

FIELD OF THE INVENTION

The present invention pertains to a motor vehicle steering column unit with a steering column housing and a steering column arranged therein and an electrically driven adjusting means for the longitudinal adjustment and the tilt adjustment of the steering column.

BACKGROUND OF THE INVENTION

Motor vehicle steering column units of this type have been known and are installed in large numbers in passenger cars as well as trucks in the automobile industry. The general design of such units is characterized in that one separate drive unit each is usually used for each direction of adjustment, i.e., for both the longitudinal adjustment and the tilt adjustment, of the steering column. Even though motor vehicle steering column units having this design have proved to be successful in practice, they lead, on the whole, to high manufacturing costs due to the large number of parts needed and the resulting increase in the cost of assembly. An additional drawback of the usual design is that a considerable amount of space is needed for installation in the area of the motor vehicle steering column unit due to the individual electric drive units. In addition, the hitherto common design can also be considered to be disadvantageous from the viewpoint of a possible weight reduction.

SUMMARY AND OBJECTS OF THE INVENTION

The primary object of the present invention is therefore to improve a motor vehicle steering column unit of this type such that its design will be improved and the manufacturing costs, the space requirement, and the weight will be markedly reduced compared with prior-art designs.

This object is accomplished according to the present invention by the adjusting means having only one electric drive unit for the rotary drive of an adjusting spindle, which is stationary in the axial longitudinal direction; at least two spindle nuts, which are arranged on the adjusting spindle and are mounted movably in the axial direction of the adjusting spindle; and at least one adjusting mechanism for each direction of movement for the longitudinal movement and for the tilting movement of the steering column; as well as one switching means each, wherein a nonpositive connection can be established between the switching means and the spindle nut located adjacent to the switching means.

This design according to the present invention leads to the great advantage that only one electric drive unit is now needed for the desired adjustment in two different directions. The corresponding adjusting mechanisms for the longitudinal movement and for the tilting movement of the steering column are driven by a common adjusting spindle, and the adjusting mechanisms can be energized separately by the switching on and off of the switching means arranged at the adjusting mechanisms. A complete electric drive unit with all its above-described drawbacks in terms of space, weight and costs is thus eliminated.

It has proved to be especially advantageous to provide the switching means with a pin, which can be moved by a lifting magnet and be introduced into a corresponding recess of the spindle nut. If a plurality of the corresponding recesses are arranged on the circumferential surface of the outside of the spindle nut concentrically to the central axis of the spindle nut, it is always guaranteed that a corresponding recess on the outside of the spindle nut will be located opposite the tip of the pin when the lifting magnet is energized and the pin is moved as a result. The recesses on the circumferential surface can be prepared at an especially low cost and in a reliably operating manner by imparting the geometric shape of teeth to the outside of the spindle nut in a corresponding area. It is guaranteed as a result that the pin performing the movement in the inward direction will automatically slide along a tooth face surface into a corresponding tooth space, which establishes a nonpositive connection between the spindle nut and the adjusting mechanism in cooperation with the pin.

It is, of course, also conceivable to use other switching means for the temporary fixed connection between the adjusting mechanism and the spindle nut, but the above-mentioned lifting magnets have proved to be especially advantageous because of their low cost, their advantage in terms of weight, as well as the small space requirement.

The space requirement for the motor vehicle steering column unit according to the present invention is additionally reduced by the fact that the adjusting mechanism for the longitudinal movement of the steering column is directly connected to the steering column housing via a connecting lever.

The adjusting mechanism for the tilting movement of the steering column advantageously has, analogously to the adjusting mechanism for the longitudinal movement, a corresponding rocker arm, in which the axial mounting of the corresponding spindle nut is fixed. Due to this design embodiment, the two adjusting mechanisms have especially compact assembly units with corresponding advantages in terms of size.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4 is a sectional view corresponding to line IV—IV in FIG. 2.

DESCRIPTION OF THE PREFERRED EMBODIMENT

Figure 1:
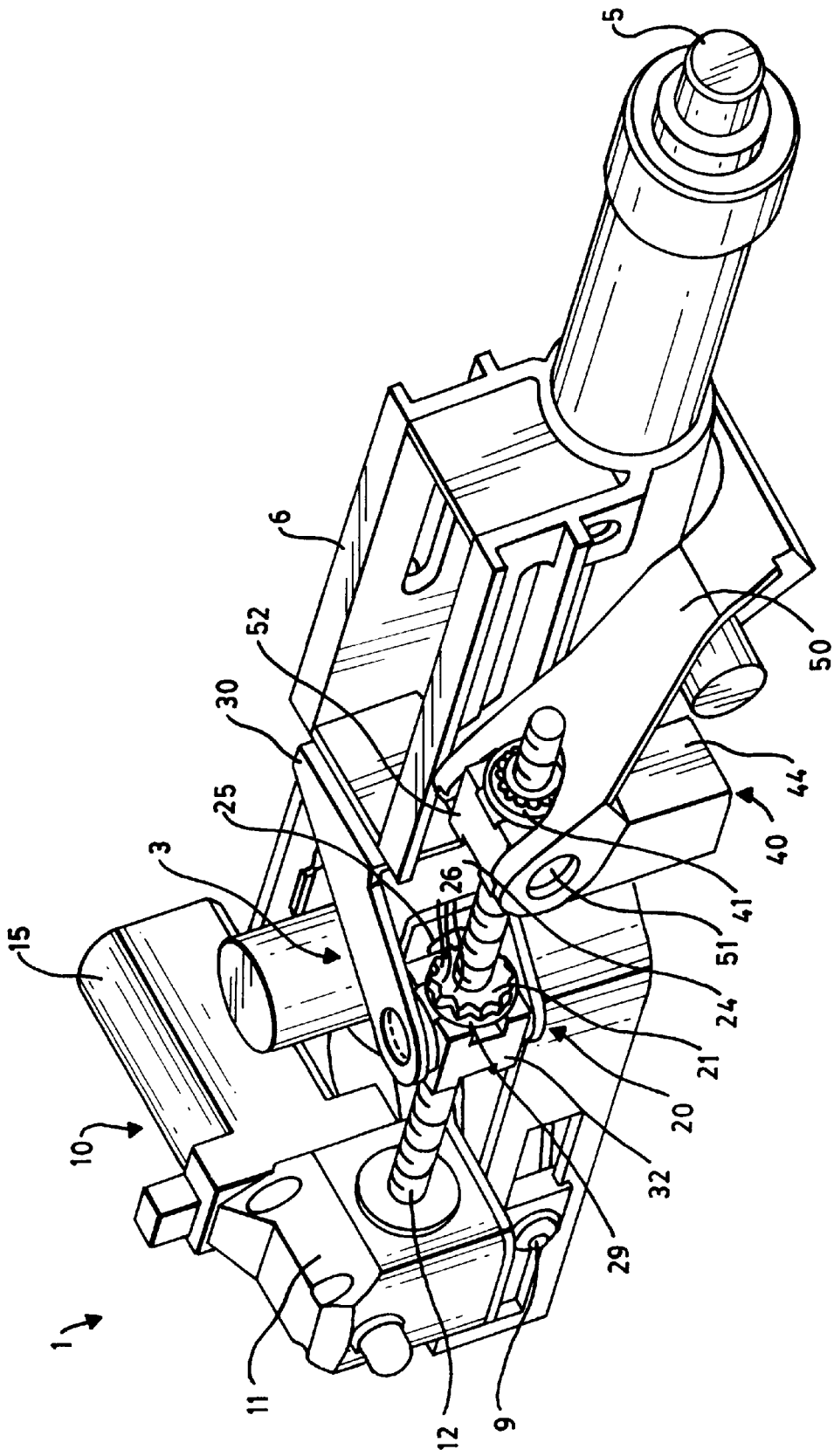
FIG. 1 is an overall perspective view of the motor vehicle steering column unit according to the present invention.
Figure 2:
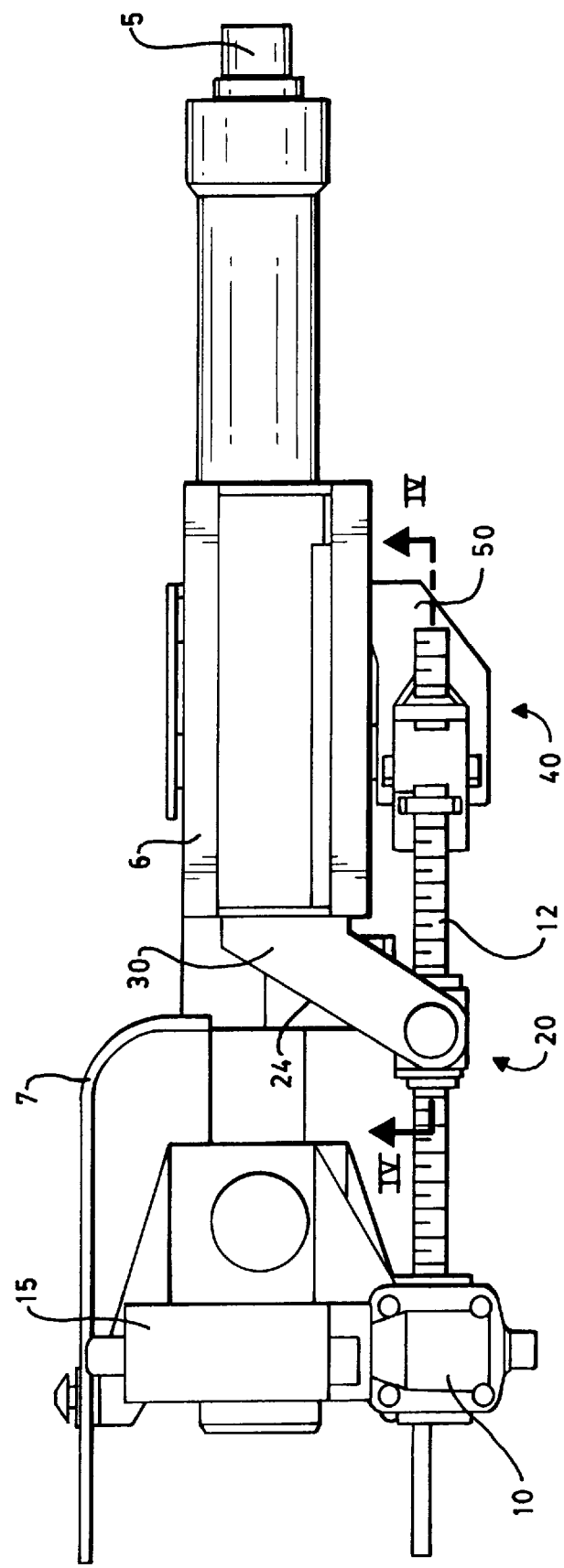
FIG. 2 is a top view of the motor vehicle steering column unit according to FIG. 1.
Figure 3:
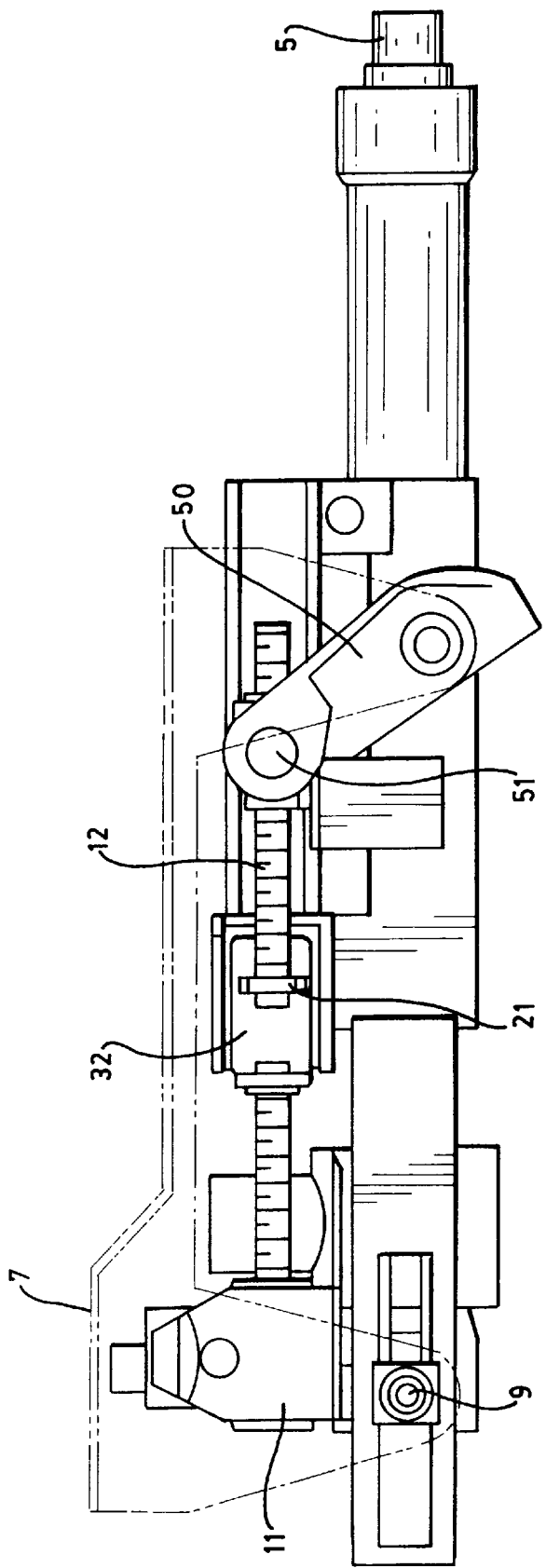
FIG. 3 is a side view of the steering column unit from FIGS. 1 and 2.

The motor vehicle steering column unit designated by reference number 1 in FIG. 1 has a steering column 5, a steering column housing 6, and an adjusting means designated in its entirety by reference number 3, wherein the adjusting means comprises a drive unit 10 and two adjusting mechanisms 20 and 40. The adjusting mechanism 20 is used for the longitudinal adjustment of the steering column 5 in this exemplary embodiment, whereas the adjusting mechanism 40 is used for the tilt adjustment of the steering column 5.

The drive unit 10 comprises essentially an electric motor-gear assembly unit 11 with flanged electric motor 15 and an inner spindle mount, not shown here. The drive unit 10 is used to rotatingly drive the adjusting spindle 12, which is fixed in the electric motor-gear assembly unit 11 in the axial longitudinal direction of the central axis of the spindle, so that the adjusting spindle 12 can perform a rotary movement only. Two spindle nuts 21 and 41, respectively, are arranged next to each other on the adjusting spindle 12, wherein the spindle nut 21 belongs to the adjusting mechanism 20 for the longitudinal adjustment, and the spindle nut 41 belongs to the adjusting mechanism 40 for the tilt adjustment. The spindle nuts 21 and 41 arranged on the adjusting spindle 12 are enclosed by a bearing housing 32 and 52, respectively. The bearing housing 32 belongs to the connecting lever 30, which is rigidly connected to the steering column housing 6. The bearing housing 52 is connected via a turning knuckle 51 to the rocker arm 50, which is used to adjust the tilt of the steering column housing 6.

It appears especially clearly from FIG. 4 that two thrust bearings 22, 23 as well as 42, 43 are located, at spaced locations from one another, within the bearing housings 32 and 52, respectively. The thrust bearings are used to mount the respective spindle nuts 21 and 41. The spindle nuts are provided with a respective through hole 33 and 53, in which internal threads corresponding to the external threads of the adjusting spindle 12 are cut. Since the torque between the adjusting spindle and the spindle nuts is greater than the torque within the thrust bearings 22, 23 as well as 42, 43, a rotary movement of the adjusting spindle 12 brings about a rotary movement of the two spindle nuts 21 and 41 in the same direction, without a change taking place in the position of the threaded spindle nuts 21 and 41, in the axial longitudinal direction of the spindle axis.

Both adjusting mechanisms 20 and 40 are provided with a respective switching means 24 and 44, which are designed as lifting magnets in the example shown here. The sectional view in FIG. 4 shows clearly that the lifting magnets are arranged adjacent and connected to the respective bearing housings 32 and 52 the lifting magnets have a respective pin 25 and 45, which can be extended from the lifting magnet housing in the direction of the central axis of the drive spindle 12 when the lifting magnet is energized. FIG. 4 shows the switching means 44 with the switching voltage applied, in which case the pin 45 of the lifting magnet engages a corresponding recess 46 of the spindle nut 41.

As is shown especially in FIG. 1, a plurality of individual recesses 26 and 46, which together form a tooth-like geometry 29 and 49, respectively, are arranged concentrically on the circumferential surface, respectively, of the respective spindle nuts 21 and 41. The arrangement of the individual recesses in the form of teeth facilitates the engagement of the corresponding pin 25 and 45, respectively, in the recess of the respective spindle nuts 21 and 41 located opposite the tip of the pin.

As soon as one of the lifting magnets is electrically energized and the corresponding pin 25 or 45 has entered one of the respective recesses 26 and 46, a nonpositive connection is established between the spindle nuts 21, 41 and the corresponding connecting lever 30 or the rocker arm 50. The rotary movement of the spindle nut is blocked by this engagement, so that a simultaneous rotation of the drive spindle forcibly leads to an axial movement of the spindle nut 21, 41 on the drive spindle 12. This axial movement will in turn lead to an axial displacement of the steering column housing 6 due to the adjusting mechanism 20, whereas an axial displacement of the spindle nut 41 leads to a tilt adjustment of the steering column via a rocker arm 50. Since both lifting magnets can be energized individually, both a separate adjustment of the steering column in the longitudinal direction or a tilt adjustment as well as a joint and simultaneous adjustment in both directions are possible, depending on whether only one of the lifting magnets or both lifting magnets are electrically energized.

To adjust the tilt of the steering column, it is necessary for the entire motor vehicle steering column unit to be rotatable around a fulcrum point 9, which is located under the drive unit 10 in this exemplary embodiment. The drive unit 10 is pivotable also around the fulcrum point 9 with a tilting movement of the steering column.

The two adjusting mechanisms 20 and 40 for the tilt adjustment and for the longitudinal adjustment are arranged one behind the other in a lateral area of the adjusting spindle in this exemplary embodiment, and the drive unit for the adjusting spindle 12 is located at the other end of the adjusting spindle 12 facing away from the adjusting mechanisms 20 and 40, respectively. Should the mounting requirements for the motor vehicle steering column unit according to the present invention presented here as an example make it necessary, it is, of course, also possible to mount the drive unit 10 in such a position that one adjusting mechanism 20 or 40 is placed on each side of the drive unit 10. The drive unit 10 would thus be arranged between the two adjusting mechanisms 20 and 40, and the drive spindle 12 would thus be mounted centrally between the adjusting mechanisms for the longitudinal adjustment and for the tilt adjustment within the electric motor-gear assembly unit 11.

It becomes clear from the drawings attached that with the exception of the geometry of the rocker arm 50 and of the connecting lever 30, the two adjusting mechanisms 20 and 40 may have the same design, which leads to a reduction in the costs due to the use of identical spindle nuts, identical mounts as well as identical switching means in the form of commercially available lifting magnets.

While a specific embodiment of the invention has been shown and described in detail to illustrate the application of the principles of the invention, it will be understood that the invention may be embodied otherwise without departing from such principles.

APPENDIX

List of Reference Numbers
1 Motor vehicle steering column unit
2 Adjusting device
5 Steering column
6 Steering column housing
7 Bracket
9 Fulcrum point
10 Drive unit
11 Electric motor-gear assembly unit
12 adjusting spindle
15 Motor
20 Adjusting mechanism for longitudinal adjustment
21 Spindle nut
22 Thrust bearing
23 Thrust bearing
24 Switching means
25 Pin
26 Recess
27 Circumferential surface
29 Teeth
30 Connecting lever
32 Bearing housing
33 Through hole
40 Adjusting mechanism for tilt adjustment
41 Spindle nut 42 Thrust bearing
43 Thrust bearing
44 Switching means
45 Pin
46 Recess
47 Circumferential surface
49 Teeth
50 Rocker arm
51 Turning knuckle
52 Bearing housing
53 Through hole

What is claimed is:

1. A motor vehicle steering column unit, comprising:
   a steering column housing;
   a steering column arranged in said steering column housing;
   an electrically driven adjusting means for longitudinal adjustment and tilt adjustment of the steering column, said adjusting means including
      a one-piece adjusting spindle,
      an electric drive unit for rotary drive of said one-piece adjusting spindle,
      at least two spindle nuts arranged on said one-piece adjusting spindle and mounted movably in an axial direction of the adjusting spindle,
      a longitudinal adjusting mechanism for longitudinal movement and a tilt adjusting mechanism for tilting movement, and
      a plurality of switching means, each said switching means being for selectively forming a nonpositive connection between the respective switching means and each of said spindle nuts located adjacent to one of said switching means.

2. The motor vehicle steering column unit in accordance with claim 1, wherein each said switching means is designed as a lifting magnet provided with a moveable pin, wherein said pin can be introduced into a respective corresponding recess of said spindle nuts.

3. The motor vehicle steerig column unit in accordance with claim 2, wherein a plurality of corresponding recesses are arranged on a circumferential surface of an outside of each of said spindle nuts concentrically to a central axis of said spindle nut.

4. The motor vehicle steering column unit in accordance with claim 3, wherein said recess form a geometric shape of teeth.

5. The motor vehicle steering column unit in accordance with claim 1, wherein said logitudinal adjusting mechanism of the steering column is directly connected to said steering column housing.

6. The motor vehicle steering column unit in accordance with claim 1, wherein said adjusting mechanism for the longitudinal movement of the steering column is directly connected to said steering column housing, wherein an axial mount of a corresponding said spindle nut is accommodated in a connecting lever of said adjusting mechanism.

7. The motor vehicle steering column unit in accordance with claim 1, wherein said adjusting mechanism for the tilting movement of the steering column has a rocker arm, in which an axial mount of a corresponding said spindle nut is fixed.

8. The motor vehicle steering column unit in accordance with claim 1, wherein said drive unit contains an electric motor-gear unit with mount for said adjusting spindle.

9. The motor vehicle steering column unit in accordance with claim 1, wherein said drive unit is pivotable around a fulcrum point with a tilting movement of the steering column.

10. The motor vehicle steering column unit in accordance with claim 1, wherein:
    said one-piece adjusting spindle is a solid, non-articulated shaft.

11. A motor vehicle steering column unit, comprising:
    a steering column housing;
    a steering column arranged in said steering column housing;
    an electrically driven adjusting means for longitudinal adjustment and tilt adjustment of the steering column, said adjusting means including
       an adjusting spindle,
       an electric drive unit for rotary drive of said adjusting spindle,
       at least two spindle nuts arranged on said adjusting spindle and mounted movably in an axial direction of the adjusting spindle,
       a longitudinal adjusting mechanism for longitudinal movement and a tilt adjusting mechanism for tilting movement,
       a plurality of switching means, each said switching means is being for selectively forming a connection between the respective switching means and each of said spindle nuts located adjacent to one of said switching means, each said switching means being designed as a lifting magnet provided with a movable pin, wherein said pin can be introduced into a respective corresponding recess of said spindle nuts.

12. The motor vehicle steering column unit in accordance with claim 11, wherein:
    said one-piece adjusting spindle is a solid, non-articulated shaft.

* * * * *